April 28, 1931.  P. VENAIL  1,803,222

POWER LOOM FOR THE MANUFACTURE OF PILE FABRICS

Filed Dec. 9, 1927   3 Sheets-Sheet 1

P. Venail
INVENTOR

By: Marks & Clerk
Attys.

April 28, 1931. P. VENAIL 1,803,222
POWER LOOM FOR THE MANUFACTURE OF PILE FABRICS
Filed Dec. 9, 1927 3 Sheets-Sheet 2
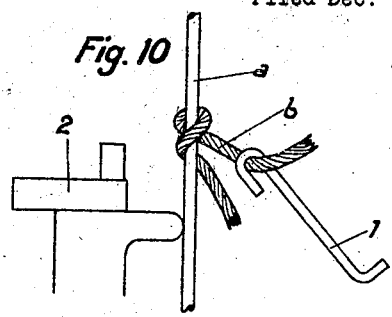
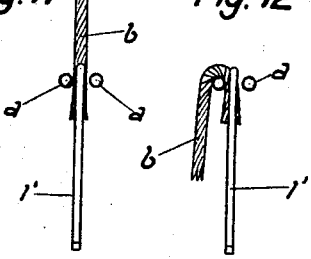
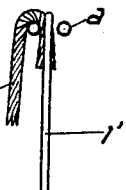
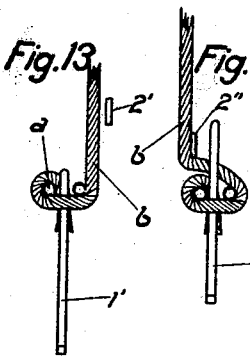
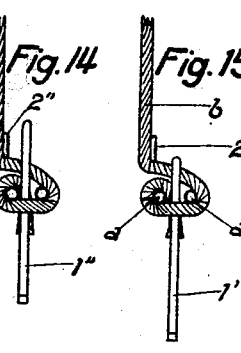
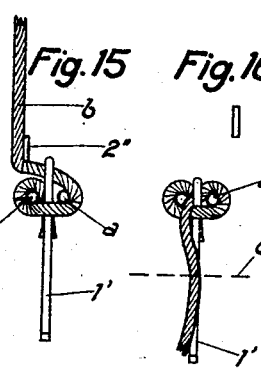
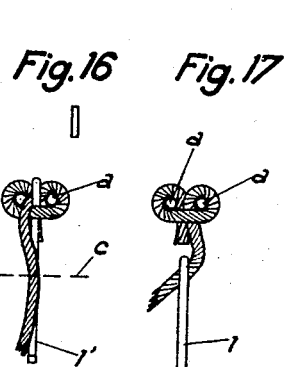
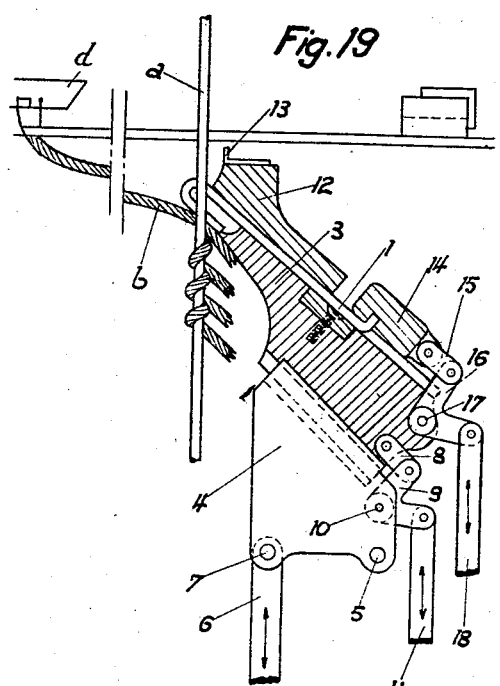
P. Venail INVENTOR
By Marks & Clerk Attys.

April 28, 1931. P. VENAIL 1,803,222
POWER LOOM FOR THE MANUFACTURE OF PILE FABRICS
Filed Dec. 9, 1927 3 Sheets-Sheet 3
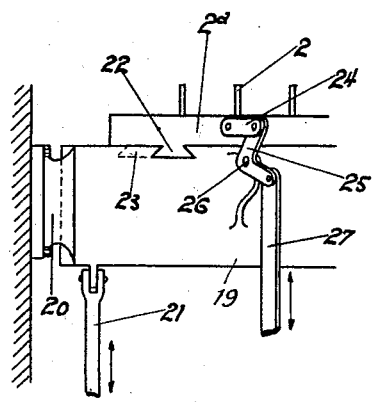
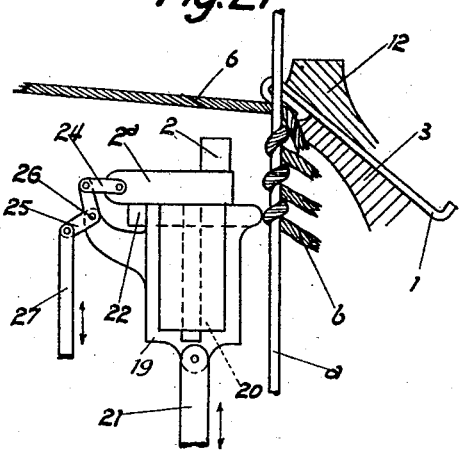
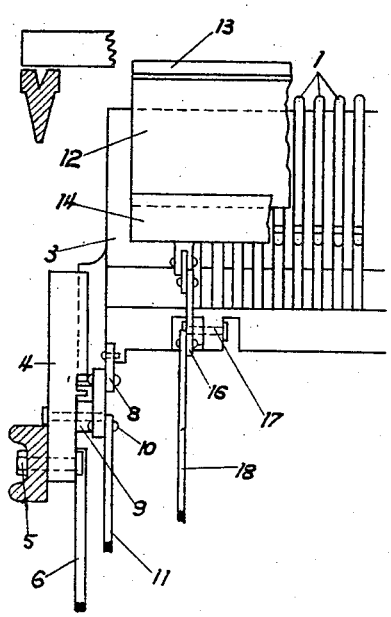
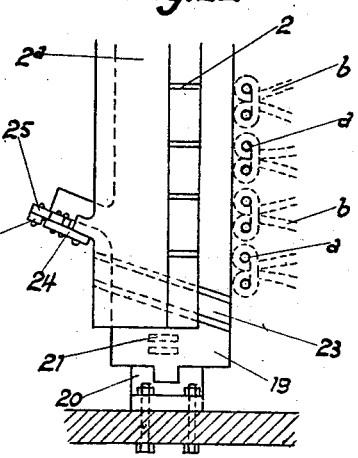

Patented Apr. 28, 1931

1,803,222

UNITED STATES PATENT OFFICE

PAUL VENAIL, OF PARIS, FRANCE, ASSIGNOR TO SOCIÉTÉ ANONYME DE FABRICATION DES TAPIS A POINTS NOUÉS "SAFTAN", OF PARIS, FRANCE

POWER LOOM FOR THE MANUFACTURE OF PILE FABRICS

Application filed December 9, 1927, Serial No. 238,944, and in France August 25, 1927.

The present invention relates to the manufacture of pile fabric more particularly knot-stitch carpets by means of the known type of power carpet looms wherein tuft-yarn inserters or needles are used for winding the tufts around warp threads selected by selecting combs or other equivalent means.

The object of the invention is to enable carpet looms of this type which are arranged for producing Indian or wound knot-stitches only, to produce also Smyrna knots. With this object in view, the invention provides for additional or supplemental means which may be applied to looms of the above mentioned type and more particularly to a loom of the above type described in the applicant's Patent No. 1,690,802 of Nov. 6, 1928.

In carpets of this type the tuft-yarn is wound by a suitable succession of movements or passages of the tuft-yarn inserters relatively to the warp threads, around certain selected warp threads so that a yarn forms normally spirals lying above each other and constituting the Indian knot or wound knot-stitches, such as shown in Fig. 1.

In order to produce a Smyrna knot, such as shown in Fig. 2, it would be necessary during the last passage of the tuft-yarn inserters through the warp threads to cause the tuft-yarn inserters to pass underneath that part of the knot which lies in front of two adjacent warp threads. Hitherto no solution of this problem has been suggested; and means for producing the Smyrna knot have been used only in carpet looms of other types than those employing tuft-yarn inserters, for instance, they have been used in looms employing tongs and which are, as is well-known, of extremely complicated and expensive construction and difficult to operate.

The present invention provides very simple, practical and inexpensive means for making the Smyrna knot which may, moreover, be easily applied to existing power looms which employ tuft-yarn inserters and are only suitable for producing the Indian or wound knots. The invention may be applied to such looms without the necessity of important modifications.

The invention has, therefore, for its object to provide means by which the knot is finished into a Smyrna knot. For this purpose the invention consists in the employment of a set of hooks arranged parallel to one another in a row in front of the warp threads and adapted to move upwards in an inclined direction between the warp threads, said hooks co-operating with a comb which is arranged parallel to the row of hooks at the rear or behind the warp threads, and being adapted to move at right angles towards and away from the warp threads, and transversely to the warp threads and also up and down.

The manner in which these two essential parts co-operate and the various movements which they perform during the knotting operation will now be fully described with reference to the accompanying drawings which show, by way of example, one constructional form of means for carrying out the invention and the adaptation of such means to the above mentioned carpet loom of the applicant.

In the accompanying drawings:

Figs. 3 to 10 show in side elevation the various positions of the main parts during the formation of the wound knot and the finishing of this knot into a Smyrna knot.

Figs. 11 to 17 are corresponding plans.

Figs. 18 and 22 show the adaptation of the invention to the above mentioned carpet loom.

Fig. 18 is an elevation showing part of a set of hooks and the member which forms the clamping and cutting table.

Fig. 19 is a cross section corresponding to Fig. 18.

Fig. 20 is an elevation illustrating the rear comb.

Fig. 21 is a cross section corresponding to Fig. 20.

Fig. 22 is a plan corresponding to Fig. 20.

Figures 1, 2:
Figs. 1 and 2 show an Indian or wound knot and a Smyrna knot respectively.
Figure 3:
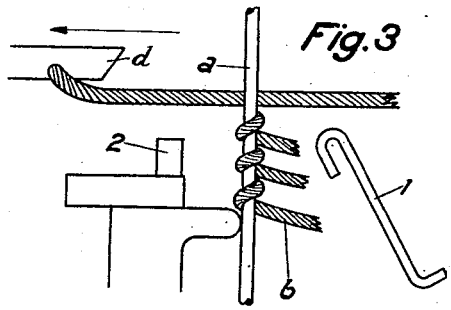
Figure 4:
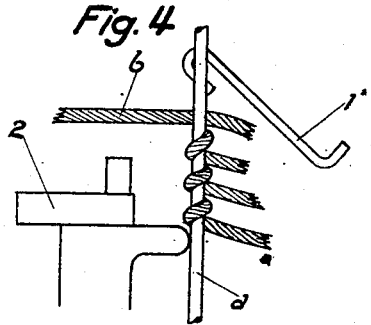

Referring now to Figs. 3 to 17 which illustrate the successive phases of the production of the knot, it will be seen that at the movement of the first passage of the tuft-yarn inserters $d$ to the rear and through the warp threads $a$, the hooks 1 are in their lowest position in front of the warp threads, whilst the comb 2 is also in the lowest position behind the warp threads and at the maximum distance therefrom. (Fig. 3.)

At the end of the first passage of the tuft-yarn inserters $d$, the hooks 1 rise (Figs. 4 and 11), move between the warp threads $a$ and stop in an intermediate position 1' in which they are above the ends of the tuft-yarns $b$.

Figure 5:
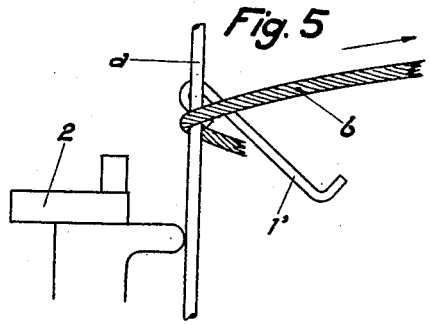
Figure 6:
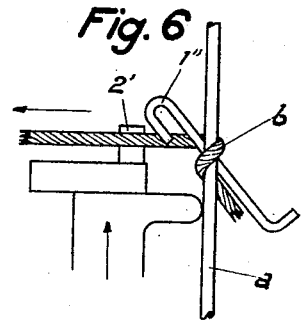
Figure 7:
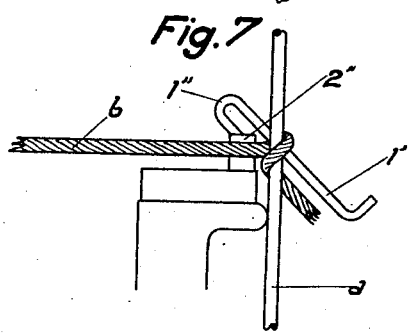

The tuft yarn inserters now perform the second passage through the threads $a$ in the forward direction, and wind the yarn around the first warp thread of each selected group of threads (Figs. 5 and 12).

During the third passage of the tuft yarn inserters through the warp threads $a$ and to the back of the threads (Figs. 6 and 13) the tuft yarn is wound around two warp threads of a selected group and over the hook which in the meantime has moved from the position shown in Fig. 5 into the higher position 1''. At the same time the rear comb 2 moves into the position 2' across and between the tuft-yarns $b$. The hooks now remain stationary in their high position 1'', the rear comb 2' moves laterally so as to bring the tuft-yarns $b$ underneath the hooks, and then move forward into the position 2'' (Figs. 7 and 14), whereby the tuft-yarns $b$ are pressed against the warp threads $a$.

Figure 8:
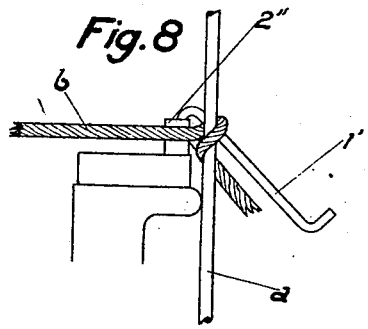
Figure 9:
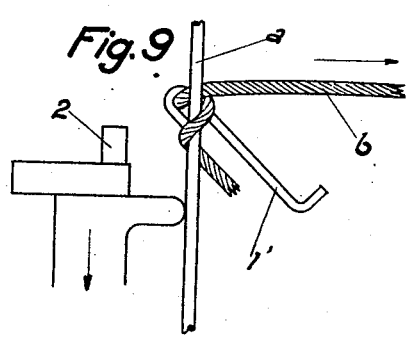

The comb now remains in the position 2'', and the hooks redescend into the intermediate position 1', drawing at the same time the tuft-yarns $b$ which are held by a comb 2'' against the warp threads $a$ (Figs. 8 and 15).

Now follows the fourth passage of the tuft-yarn inserters through the warp threads (Figs. 9 and 16) in the forward direction, the comb retreating at the same time into its initial position 2, and the hooks remaining stationary in their intermediate position 1'. The tuft-yarns $b$ are then cut at $c$.

As the ends of the tuft-yarns $b$ are now made free by the cutting operation, the hooks in redescending into their initial low position 1 carry during their movement the ends of the tuft-yarns underneath the transverse portion of the knot and thus transform the Indian or wound knot produced by the tuft-yarn inserters into a Smyrna knot (Figs. 10 and 17).

Figs. 18 to 22 show the means for carrying out the present invention as applied to a carpet loom described in applicant's Patent No. 1,690,802 of Nov. 6, 1928.

The hooks 1 are slidably mounted in grooves of a transverse support 3 extending across the whole width of the loom. This transverse support takes the place of the cutting table used in the construction of loom referred to. The support 3 is slidably mounted at both ends in inclined guideways of a further support 4 which is mounted to turn about pivots 5 in the frame of the loom.

The support 4 may be swung about the pivots 5 and thus raised and lowered by means of connecting rods 6 pivoted to the support 4 at 7 and receiving movement from the main shaft of the loom by any suitable means, for instance, a lever and eccentric. The support 3 receives its sliding movement in the support 4 by means of a link 8, double armed lever 9 pivoted in the support 4 at 10, and a link 11 which is operated from the main shaft of the loom by means of a lever and a cam.

A plate 12 covers and protects the upper parts of the hooks 1 upon the support 3 and carries an angle piece 13 which serves as a cutting table.

The movement of the hooks 1 upon the support 3 is effected by a cross member 14 which engages the rear ends of the hooks 1 and receives its movement through a link 15, an elbow lever 16 pivotally mounted upon the support 3 at 17, and a link 18 operated from the main shaft of the loom through a suitable device, say a lever and a cam mounted on the shaft.

The movement of the hooks relatively to the support 3 produces the intermediate position 1' and the high position 1'' of the hooks referred to above, whilst the sliding movement of the support 3 in the guideways of the support 4 produces the low position 1 of the hooks.

The rear comb is constituted in this construction by a cross bar or plate $2^a$ provided with projections or teeth 2 and adapted to slide in a support 19 extending across the whole width of the carpet loom. This support 19 is slidably mounted at both ends in vertical guideways 20 of the frame of the loom. The up and down movement of the support 19 is effected by links 21 and levers and cams mounted upon the main shaft of the loom.

The horizontal transverse movement of the bar $2^a$ upon the support 19 is effected by projections 22 of the bar $2^a$ sliding in suitable horizontal oblique guideways 23 of the support 19, the bar $2^a$ being operated by means of links 24, levers 25 pivoted to the support 19 at 26, and links 27, the latter being operated from the main shaft by other levers and cams (not shown).

It will be understood that the means for carrying out the invention may be modified or altered according to the requirements and particularly according to the type of loom to which the invention is to be applied, without departing from the spirit of the invention.

What I claim is:

1. An improved method of producing Smyrna carpets upon a power loom consisting in first producing Indian knots and then transforming the Indian knots into Smyrna knots by drawing the second end of the Indian knot under the transverse part of the knot separating the first end of the knot from the second end, so that the second end of the knot lies in the same plane as the first end, substantially as described.

2. In a carpet loom having means for the production of Indian knots, the provision of separate means for transforming the Indian knots into Smyrna knots, said means comprising a comb and hooks adapted to draw the second ends of the knots under the transverse parts of the knots and into contact with the first ends, substantially as described.

3. In a carpet loom in which Indian knots are produced in known manner by means of reciprocating tuft-yarn inserters, the provision of a comb and hooks for transforming the Indian knots into Smyrna knots, substantially as described.

4. In a carpet loom provided with reciprocating tuft-yarn inserters for producing Indian knots, the provision of hooks arranged at one side of the warp threads and a comb arranged at the other side of the warp threads, such hooks and comb being adapted to co-operate in transforming the Indian knots into Smyrna knots by pulling the second end of the Indian knots under the cross portions of the knots and into contact with the first end, substantially as described.

5. In a carpet loom having means for the production of Indian knots, such means comprising reciprocating tuft-yarn inserters, the combination of hooks arranged upon one side of the warp threads, such hooks being capable of a reciprocating movement in inclined guideways and also of an up and down movement, and a comb arranged upon the other side of the warp threads and capable of movement towards and from the warp threads, and up and down movement and a transverse movement, substantially as and for the purpose described.

In testimony whereof I affix my signature.

PAUL VENAIL.